(12) United States Patent
de Sousa Junior

(10) Patent No.: US 11,825,851 B2
(45) Date of Patent: Nov. 28, 2023

(54) DOUGH KNEADING AND SHAPING MACHINE

(71) Applicant: Metalúrgica Siemsen Ltda., Brusque (BR)

(72) Inventor: Eloy Marcilio de Sousa Junior, Brusque (BR)

(73) Assignee: Metalúrgica Siemsen Ltda., Brusque (BR)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 17/676,166

(22) Filed: Feb. 20, 2022

(65) Prior Publication Data

US 2023/0263173 A1 Aug. 24, 2023

(51) Int. Cl.
*A21C 1/08* (2006.01)

(52) U.S. Cl.
CPC ..................... *A21C 1/08* (2013.01)

(58) Field of Classification Search
CPC ........... A21C 1/08; A21C 3/024; A21C 3/028; A21C 3/025; A21C 3/027; A21C 11/008; B29B 7/18; B29B 7/465

See application file for complete search history.

(56) References Cited

U.S. PATENT DOCUMENTS

| 1,064,741 | A | * | 6/1913 | Jones | .................... | B29C 43/24 |
| | | | | | | 425/366 |
| 1,628,828 | A | * | 5/1927 | Denmead | .............. | F16K 31/524 |
| | | | | | | 425/293 |
| 2,797,651 | A | * | 7/1957 | Iruegas | ................ | A21C 11/008 |
| | | | | | | 492/14 |

(Continued)

FOREIGN PATENT DOCUMENTS

| BR | PI0901454 A2 | 6/2010 | | |
| BR | 10202015114-2 B1 | * | 12/2021 | ............. A21C 11/00 |

(Continued)

OTHER PUBLICATIONS

"Those Joints Explained", Drive, https://www.drive.com.au/caradvice/those-joints-explained-20100824-13npd/, see pp. 1-2. (Year: 2016).*

(Continued)

*Primary Examiner* — Emmanuel S Luk
(74) *Attorney, Agent, or Firm* — Zhigang Ma (57) ABSTRACT

DOUGH KNEADING AND SHAPING MACHINE with conical rollers to knead and shape dough on a table, including a drive mechanism comprising a gear motor with axis at the output of the reducer, and the end of the axis is set in a beam which has, at each end, a pair of gears geared to a sprocket fixed to the structural body of the machine, the gears have an axis supported on bearings and coupled to a universal joint, and the universal joint transmits rotation to an axis, and the axis has at the bearing ends embedded in the rigid structure and with the aid of screws and structural elements, the rigid frame is fixed to the beam, and the axis end is set at the vertex of the body of the cone, and the cone has a surface cap fixed by screws on the body to cover the entire conical surface of the cone.

7 Claims, 10 Drawing Sheets

(56) References Cited

U.S. PATENT DOCUMENTS

| | | | | |
|---|---|---|---|---|
| 4,375,349 | A * | 3/1983 | Vrbanek | A21C 9/08 425/374 |
| 4,806,090 | A * | 2/1989 | Finlay | A21C 11/008 425/363 |
| 4,857,349 | A * | 8/1989 | Finlay | A21C 11/008 425/383 |
| 5,811,137 | A * | 9/1998 | Clark | A21C 3/02 100/168 |
| 7,354,187 | B2 * | 4/2008 | Yada | B29C 48/08 366/85 |
| 8,123,513 | B2 * | 2/2012 | Morikawa | A21C 11/008 425/374 |
| 2002/0043057 | A1 * | 4/2002 | Shiba | B62D 3/02 56/1 |
| 2009/0162512 | A1 * | 6/2009 | Morikawa | A21C 11/008 426/551 |
| 2009/0226587 | A1 * | 9/2009 | Morikawa | A21C 11/008 425/135 |
| 2011/0135795 | A1 * | 6/2011 | Lopez | A23P 20/20 99/450.7 |
| 2018/0132489 | A1 * | 5/2018 | Rubio Lamas | A23P 30/20 |
| 2020/0229450 | A1 * | 7/2020 | Morello | A21D 13/41 |
| 2020/0368958 | A1 * | 11/2020 | Higashi | B29B 7/726 |

FOREIGN PATENT DOCUMENTS

| | | | | |
|---|---|---|---|---|
| CA | 2690423 | A1 * | 7/2011 | A21C 11/008 |
| EP | 1707053 | A2 * | 10/2006 | A21C 11/008 |
| GB | 224073 | A | 7/1924 | |
| WO | WO-2006129759 | A1 * | 12/2006 | A21C 11/008 |
| WO | WO-2022016246 | A1 * | 1/2022 | A21C 3/02 |

OTHER PUBLICATIONS

Google patents, machine translation of WO2022016246, https://patents.google.com/patent/WO2022016246A1/en?oq=wo2022016246, 5 pages. (Year: 2022).*

Wilson, Elliot, Universal Joints vs Other Coupling Types, May 28, 2015, www.couplinganswers.com/2015/05/universal-joints-vs-other-coupling-types.html, 3 pages. (Year: 2015).*

* cited by examiner

DOUGH KNEADING AND SHAPING MACHINE

It is the drive mechanism of the conical rollers of a dough kneading and shaping machine, of the type used in the preparation of pizza, and comprises the kinematic chain of driving the conical rollers that in circular motion compress the dough on a lifting table and also comprises the lifting mechanism of the lifting table, which by the action of a manual lever linearly displaces the lifting table against the conical surface of the rollers.

STATE OF THE ART

The process of kneading and shaping basic dough begins by placing a ball of dough in the center of the lifting table, next to the vertices of the conical rollers. The conical rollers are arranged radially with the vertices of the conical rollers converging to a central point of rotation and then, by contact and compression of the rollers, the dough is transferred to the peripheral end of the dough (edge) by varying the tangential velocity present in the body of the conical rollers. Action similar to the manual process of opening pizza dough. The use of conical rotating rollers to knead and shape dough into a flat disc format is already known in the current state of the art.

Patent document KR 1020120018482, filed on Mar. 5, 2012, describes equipment that uses conical rollers and has a motor to make the rotation movement of the block containing the conical rollers, called roller translation movement. Each roller has a motor to rotate the roller in relation to its axis. The table has an upward movement to compress the dough against the conical rollers; it uses a hydraulic jack or jack with a lever and rack to make the linear displacement of the table. The individual roller motors need to be electrically and kinematically synchronized to ensure efficiency in uniform dough shaping. As the force needed to lift the table is small enough, the activation device can be manual, using lever arms, eliminating the use of jacks.

Patent document U.S. Pat. No. 8,123,513, patented in 2009, filed in PCT Jun. 1, 2006 comprises a table for supporting the dough, consisting of a mat. Kneading the dough is done by the downward movement of a block containing conical rollers. Downward movement is achieved by hydraulic piston or servo motor driven ball screw. The conical roller block has a rotating movement by the action of an electric motor positioned on top of the block that contains the conical rollers. Each conical roller has its own electric motor to rotate each roller around its own axis. The rollers are rotated by their own electric motor, adjusted to rotate at a higher speed than when they are passively rotated by the rotating movement of the conical roller block. The kneading of the dough occurs by the downward displacement of the block which, through the conical rollers, compresses the dough on the static table. Patent document U.S. Pat. No. 8,123,513 describes a second version of driving the rotation of all conical rollers through a single electric motor positioned on top of the equipment and which uses a concentric axis with the axis of rotation of the conical roller block. The rotating movement of the conical roller block is also called the translational movement of the conical rollers. It uses a toothed belt system to transmit the rotation movement from the concentric axis to the rotation axes of each conical roller. Patent document U.S. Pat. No. 8,123,513 describes a third version of driving the rotation of the conical rollers. Each conical roller has a pinion gear that is meshed with a static guide gear. The static guide gear, in the form of a ring, is mounted in a horizontal plane very close to the work and kneading table. It has transmission by gears and sprockets. The same motor that drives the rotation of the conical roller block also drives the rotation of each conical roller once the pinion gears are engaged with the static guide gear. Rolling conical rollers have a rotation speed determined by the number of gear teeth on each pinion in relation to the number of teeth on the static guide gear. Static guide gear, positioned very close to the work table, provides accumulation of unwanted residues in food processing. The dough kneading and shaping machine, described in this report, reveals a drive mechanism for the conical rollers, far from the kneading region. The constructive arrangement revealed eliminates unwanted food contamination.

Patent document BR 102018073142-4 filed on Nov. 9, 2018, under the title PIZZA DOUGH OPENER, describes a dough kneading and shaping machine used in the preparation of pizza and comprises a motor that, through a reduction box, rotates the set formed by the bearings, the sprockets and the conical rollers. The machine has a spur gear fixed to the machine frame and geared to the sprockets and makes the conical rollers rotate in relation to the axis itself. The conical rollers, in addition to having a rotation movement in relation to their own axes, have a translation movement guided by the spur gear. The conical rollers are arranged radially with their vertices converging to the center and their generatrix tangent to the same plane, and the machine has a flat and rigid tray positioned away from the conical rollers and parallel to the generatrix of the conical rollers. With the aid of a manual lever, said flat tray placed under the conical rollers has a vertical translation displacement. The flat tray presses the dough against the conical surface of the conical rollers. Static guide gear, positioned very close to the work table, provides accumulation of unwanted residues in food processing. This constructive arrangement provides accumulation of undesirable residues in food processing. The dough kneading and shaping machine, described in this report, reveals a drive mechanism for the conical rollers that uses the transmission of the rotational movements of the conical roller through universal joints, eliminating the pinion gear and the spur gear. Consequently, moving the mechanical transmission kinematic chain away from the basic dough handling zone. It reveals a constructive arrangement that eliminates undesirable food contamination.

Patent document JP2008054641 describes an apparatus and method of uniformly kneading and shaping dough, without causing the dough to slip on the spreader rollers and without shrinking the dough when it is spread out in a flat shape. In the kneading method, the dough 25 is placed on a table 27 in a flat shape, a beam 11 movable in relation to the table 27 is equipped with conical extension, movable and rotating rollers 15 in relation to the table 27. When the rollers 15 are pressed against dough 25 to spread it out, rollers 15 are driven and rotated to spread dough 25 at a higher speed, whereby rollers 15 are moved around and rotated subordinately. Rotating members 21 attached to rollers 15 are movably connected with respect to ring members 23 and then beam 11 is rotated so as to rotate rollers 15 (see summary). Beam 11 is integrally provided with a plurality of inclined support arms 13 so that the underside is separated from the axis of rotation, and the conical extension roller 15 is rotatably supported on the support arm 13. More specifically, a support axis 17 extending in a direction orthogonal to the support arm 13 is connected to the support arm 13 and the extension roller 15 is connected to the support axis 17, the roller 15 being rotatably supported by means of the bearing 19 (see paragraph 17 of the descriptive report and FIG. 3). When beam 11 is rotated by motor 9, the roller 15 is rotated and the pinion gear 21 is engaged with the ring gear 23 so that the pinion gear 21 rotates relative to the ring gear 23 and the roller 15 also rotates (see paragraph 19 of the descriptive report and FIG. 2). Pinion gear 21 and ring gear 23 are positioned very close to the work table. This constructive arrangement provides accumulation of undesirable residues in food processing. The basic dough kneading and shaping machine, described in this report, reveals a drive mechanism for the conical rollers that uses the transmission of the rotational movements of the conical roller through universal joints, eliminating the pinion gear 21 and the ring gear 23. Consequently, moving the mechanical transmission kinematic chain away from the basic dough handling zone. It reveals a constructive arrangement that eliminates undesirable food contamination.

Patent document GB224073 deals with a machine for kneading and shaping dough, comprising a conical receptacle formed by rollers that are rotated to give a screwing and winding action on the dough. Beam 4 supports conical rollers 1, having their axes slightly eccentric in relation to the center of the machine, which are driven through conical and crown wheels 5, 8; 6, 7. The frame can be tilted over the bearings 10 to discharge the shaped dough and a central ejector is provided operated by a fixed cam engaged by a roller 16 against the action of a spring 13. Each roller axis 2 is in two parts connected by a universal joint 17. The lower portion oscillates on a bifurcated guide 18 and is raised and lowered by cam slots 19 on protrusions 20 on a ring 21, which allows the rollers to oscillate or rotate through the cranks of an oscillating frame (see summary and FIG. 3).

Figure 3:
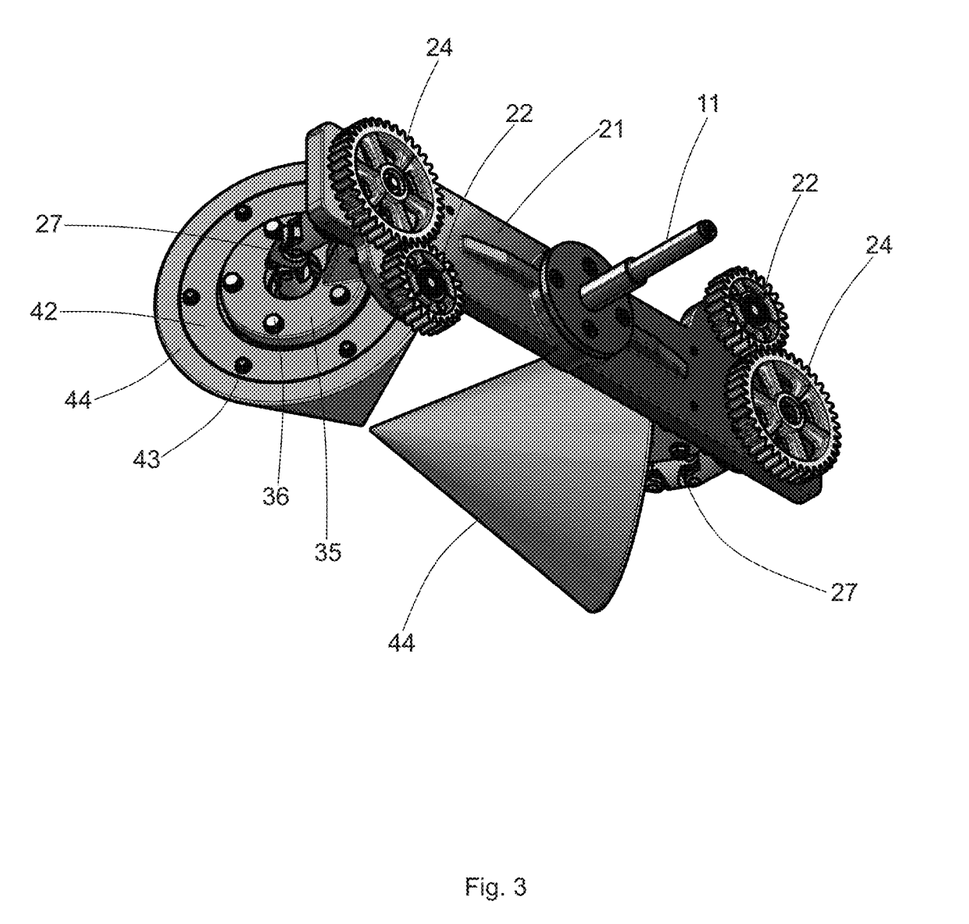
FIG. 3 shows partial three-dimensional view of the translation mechanism (2) of the pair of conical rollers (4).

In document GB224073, shown in FIG. 3, the drive, made by the universal joint, has only a rotation movement on the cone axis and has no translation movement on the central axis of the machine. It differs from the machine for kneading and shaping dough revealed in this report, as in this machine the universal joint receives rotational movement from gears that have the axis supported by bearings and coupled to a universal joint and the translation movement receives from a beam that contains, at each end, a pair of gears, characterizing that the universal joint does not have a fixed position in relation to the central axis of the machine.

In the kneading and shaping machine, revealed in this report, there is a double universal joint due to the application angle being greater than 45°, which is not possible in simple joints whose angular range is from 0 to 45° while in double joints it is from 0 to 90°.

Invention Objectives

The dough kneading and shaping machine, revealed in this report, has a constructive arrangement that uses mechanical resources and traditionally known machine elements and manual control by lever in the elevation of the table. This does not require a qualified operator and reduces the cost of manufacturing and operating the machine, with energy savings. It has a single drive motor that activates the rotation of the block that contains the conical rollers, as well as driving the rotational movement of the conical rollers in relation to the axis itself. It has a static guide gear positioned on top of the machine; away from the work table, providing a shield from the accumulation of undesirable residues typical in food and flour processing.

The kneading of the dough occurs by the upward displacement of the lifting table that compresses the dough against the conical rollers of the block. The conical block rollers do not move towards or away from the lifting table. The table is the one that approaches or moves away from the rollers. The mechanism of rotation and bearing movement of the conical rollers on the table comprises two gears, pinion type, one of them geared to a sprocket fixed in the structural body of the machine. The pinion rotation is transmitted to the conical roller rotation through a universal joint. The activation of the rotation of each one of the conical rollers through a universal joint gives more versatility to the design of the machine, allowing different adjustments to the individual angle of the conical rollers in relation to the table; the kinematic chain is maintained. A universal joint accepts misalignment between pinion axis and conical roller axis; different from transmission by gears and sprockets.

The use of Universal Joints makes an intermediate table to support the conical gear unnecessary, which makes the system have fewer mechanical parts in the processing region so that it is more hygienic, easier to clean and easier to disassemble. The use of Universal Joints allows individual adjustment of the rollers, which can result in flat dough or with a thickness variation in the section, being from the center to the edge or from the edge to the center. The use of Universal Joints makes the system mechanically more rigid, due to the presence of bearings inside the cones. Universal Joints may be replaced by Homokinetic Joints with the same functionality.

DESCRIPTION OF DRAWINGS

The machine according to the present invention is further explained by means of the attached drawings, in which.

DETAILED DESCRIPTION OF THE INVENTION

Figure 1:
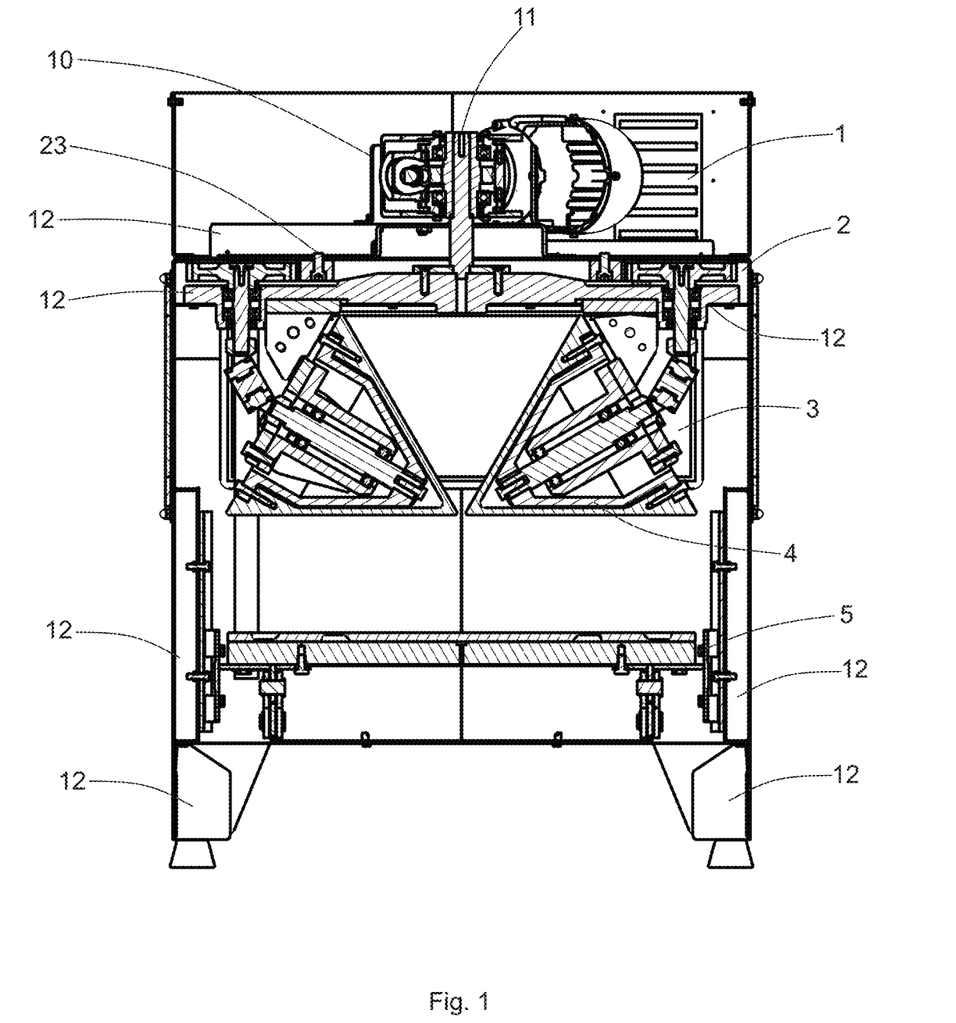
FIG. 1 shows the electrically driven gear motor of the dough kneading and shaping machine, consisting of the gear motor (1), axis (11) of the reducer (10) and the entire structural body (12) of the dough kneading and shaping machine. It shows the translation mechanism (2) of the pair of conical rollers (4). It shows the rotation mechanism (3) of the conical rollers (4) around the axis (31). It shows the structural conformation of the rollers (4). It also shows the lifting mechanism (5) of the table (58) for lifting and supporting the dough to be kneaded and shaped.
Figure 2:
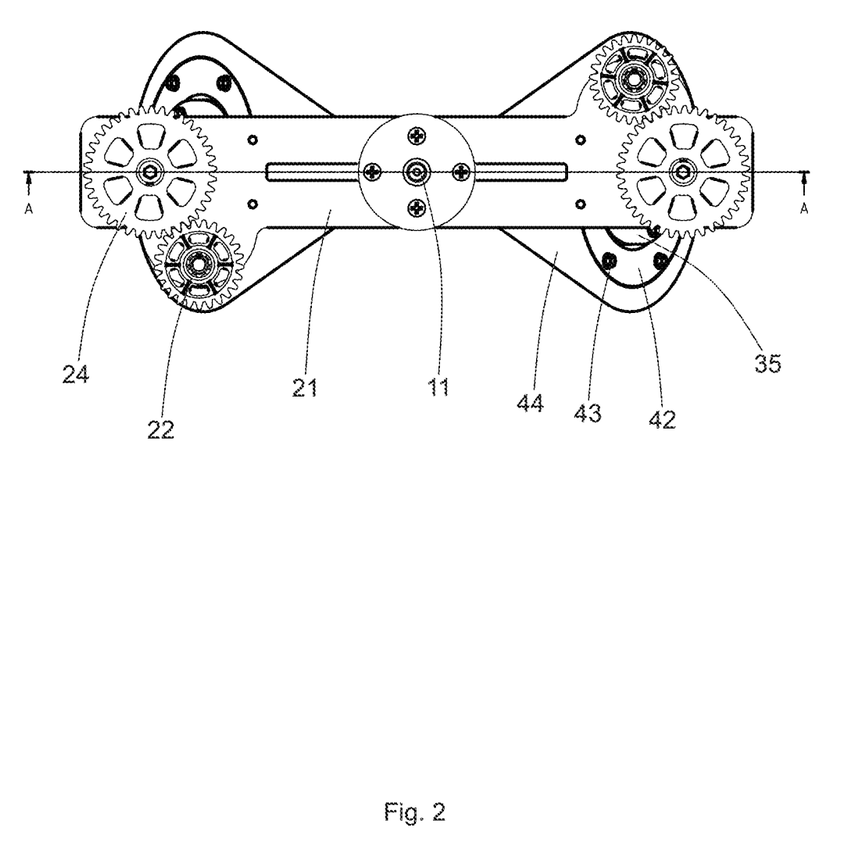
FIG. 2 shows a top view of the translation mechanism (2) and shows a beam (21) rotated by the axis (11); The beam (21) contains at each end a pair of gears (22 and 24).
Figure 4:
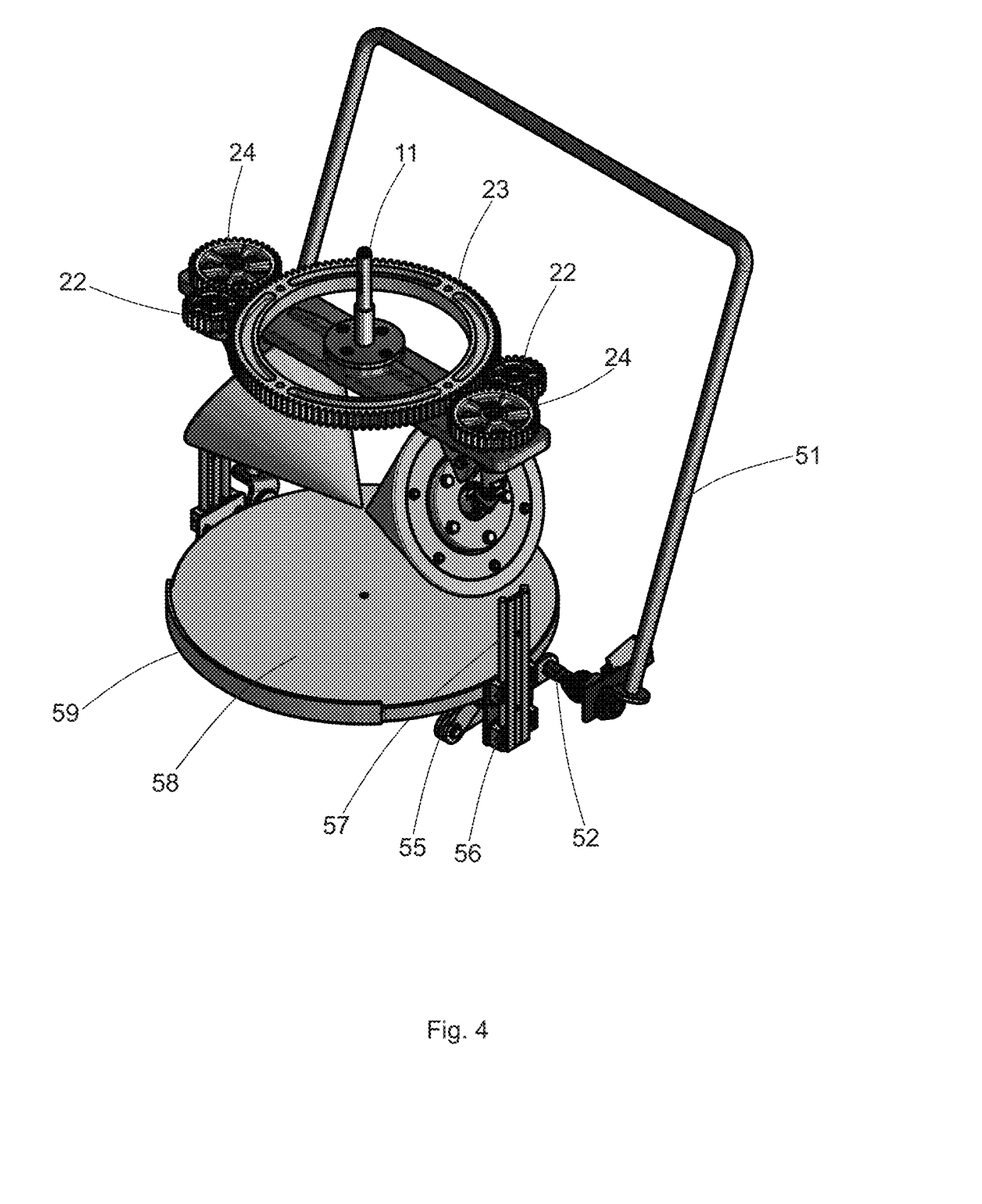
FIG. 4 shows partial three-dimensional view of the translation mechanism (2) of the pair of rollers (4) and shows components of the lifting mechanism (5) of the lifting table (58).
Figure 5:
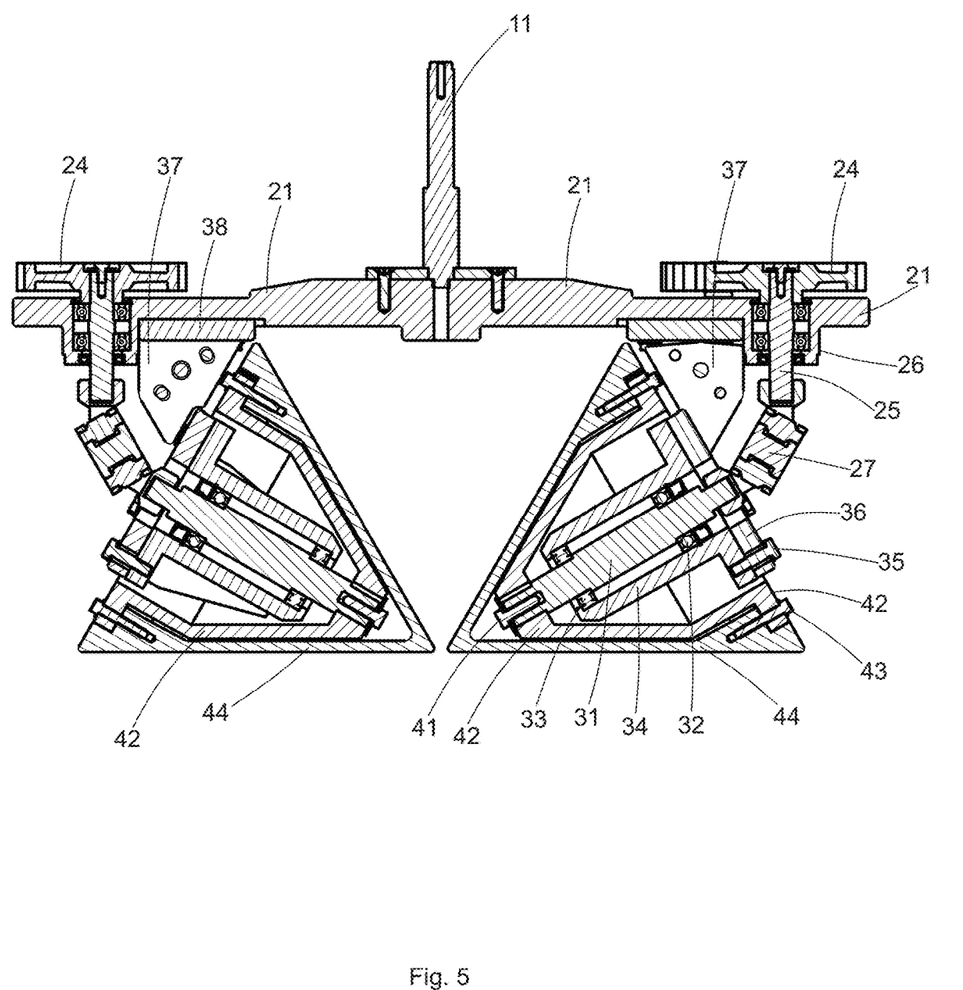
FIG. 5 is a longitudinal sectional view of the translation mechanism (2), the rotation mechanism (3) and the structural conformation of the rollers (4).
Figure 6:
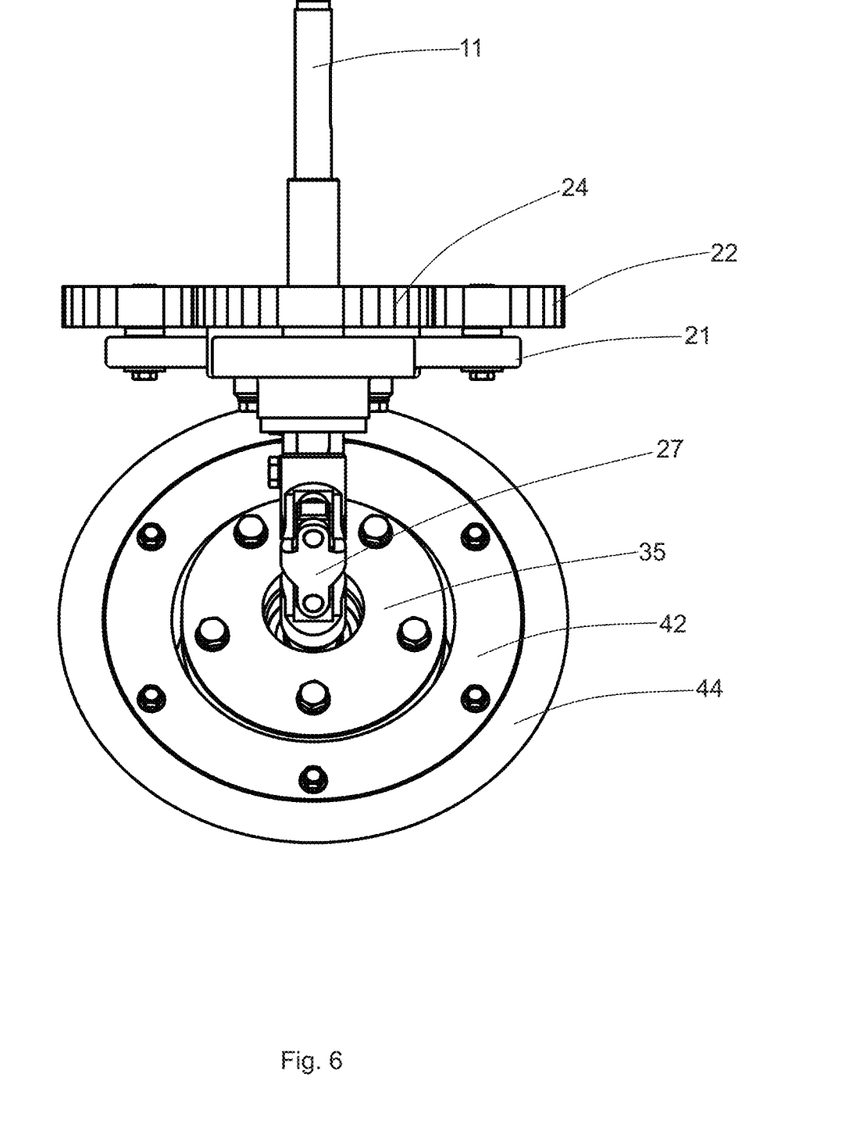
FIG. 6 is a side view of the roller movement transmission mechanism (4) from the axis (11).

The drive mechanism of the dough kneading and shaping machine, revealed in this report, comprises a gear motor (1) with axis (11) at the output of the reducer (10), as shown in FIG. 1. The axis end (11) is set in a beam (21) which has, at each end, a pair of gears (22 and 24), as shown in FIGS. 2 and 3. The gears (22) are engaged in a sprocket (23) fixed to the structural body (12) of the dough kneading and shaping machine, as shown in FIG. 4. The gears (24) have an axis (25) supported by bearings (26) and coupled to a universal joint (27), as shown in FIG. 5. The universal joint (27) transmits rotation to an axis (31) as shown in FIG. 5. The axis (31) has bearing ends (32 and 33) embedded in the rigid structure (34). With the aid of screws (35) and structural elements (36 and 37), the rigid structure (34) is fixed to the beam (21), as shown in FIG. 5. The axis end (31) is embedded in the apex (41) of the body (42) of the cone (4), as shown in FIG. 5. The cone (4) has a surface cap (44) fixed by screws (43) in the body (42). The surface cap (44) covers the entire conical surface of the cone (4).

Figure 7:
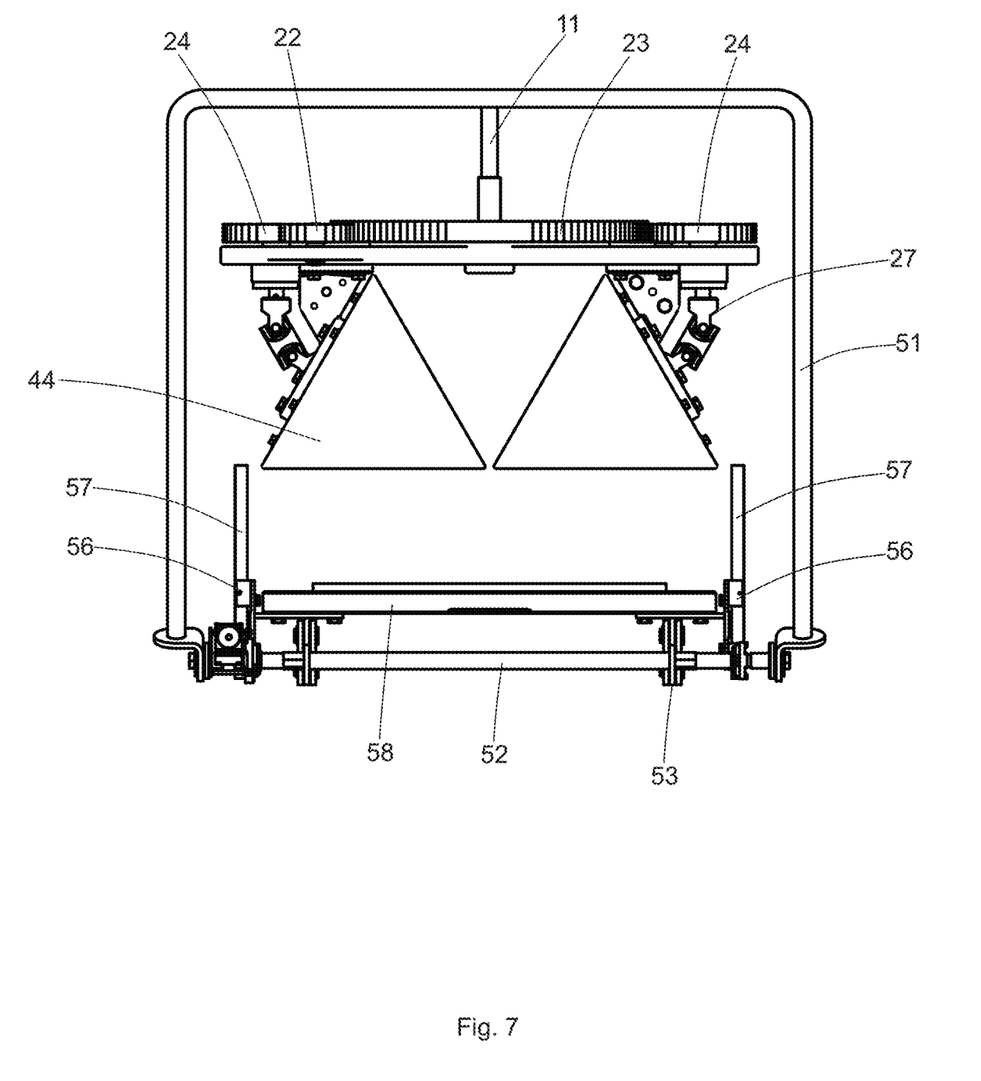
FIG. 7 is a front view of the machine for kneading and shaping dough, highlighting the lifting mechanism (5) of the lifting table (58). The lifting mechanism (5) comprises the manual lever (51), the longitudinal bar (52), the rotation rod (54), the pivot bar (55), the sliding bearing (56), the linear guide (57) and the lifting table (58) with the high edge (59).
Figure 8:
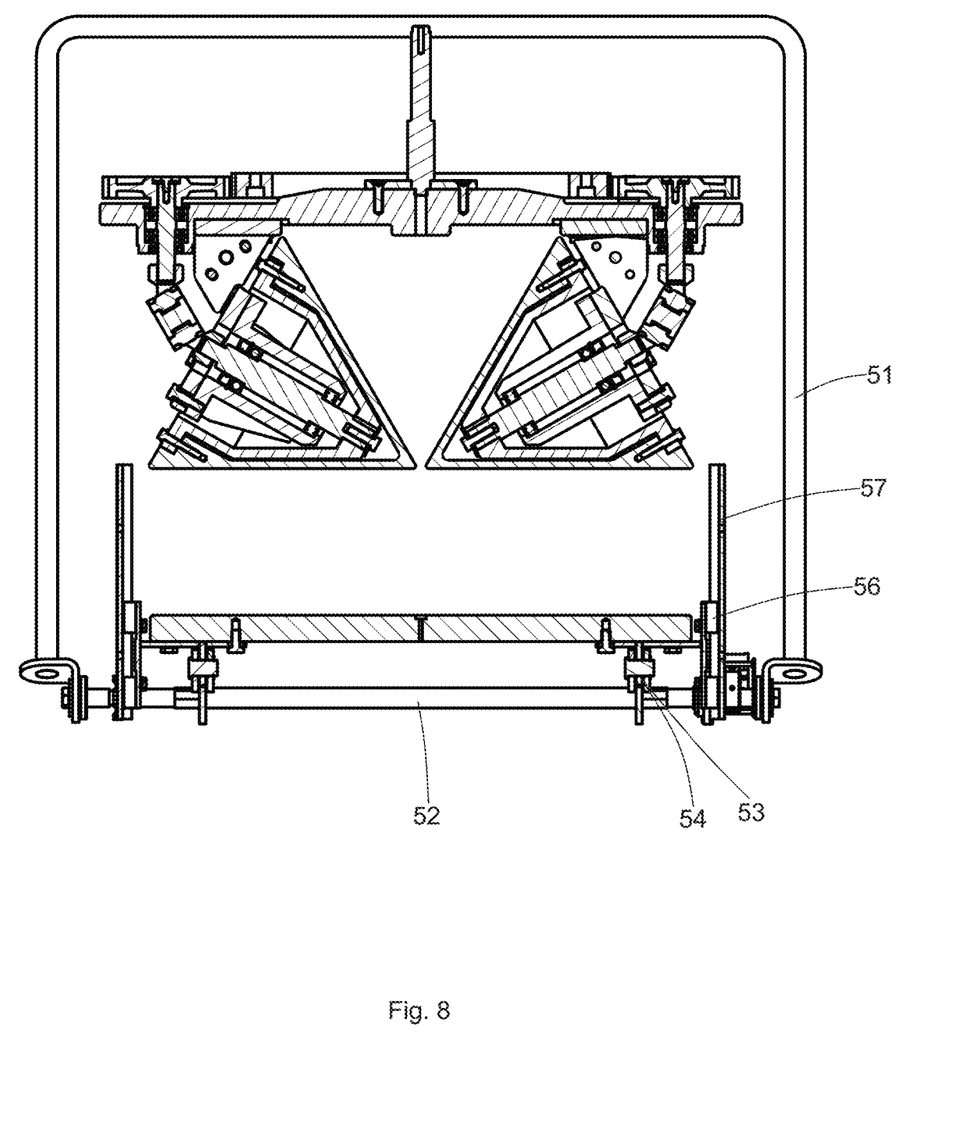
FIG. 8 is a front view, in section, of the dough kneading and shaping machine.
Figure 9:
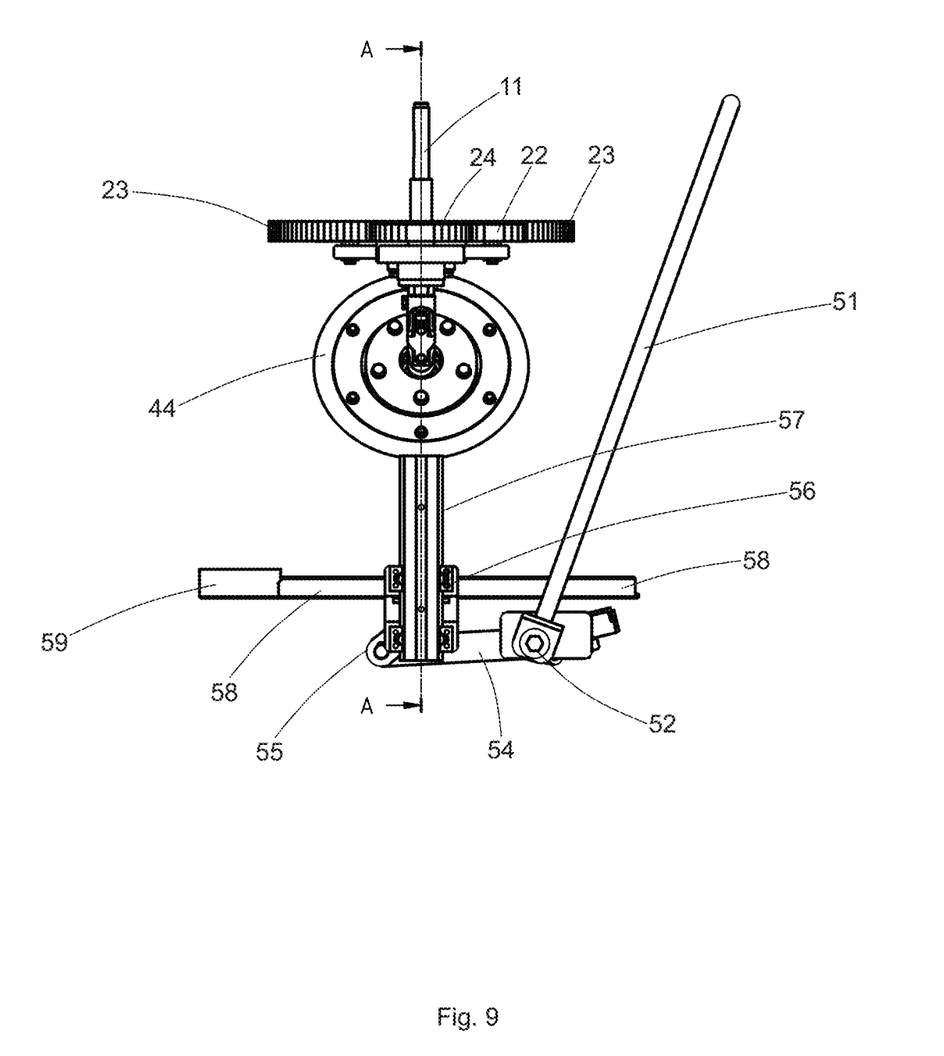
FIG. 9 is a side view of the dough kneading and shaping machine, highlighting the lifting mechanism (5) of the lifting table (58). It shows the manual lever (51), the bezel (53) of the longitudinal bar (52) with the rotation rod (54), the pivot bar (55), the sliding bearing (56), the linear guide (57), the lifting table (58) with the high edge (59).
Figure 10:
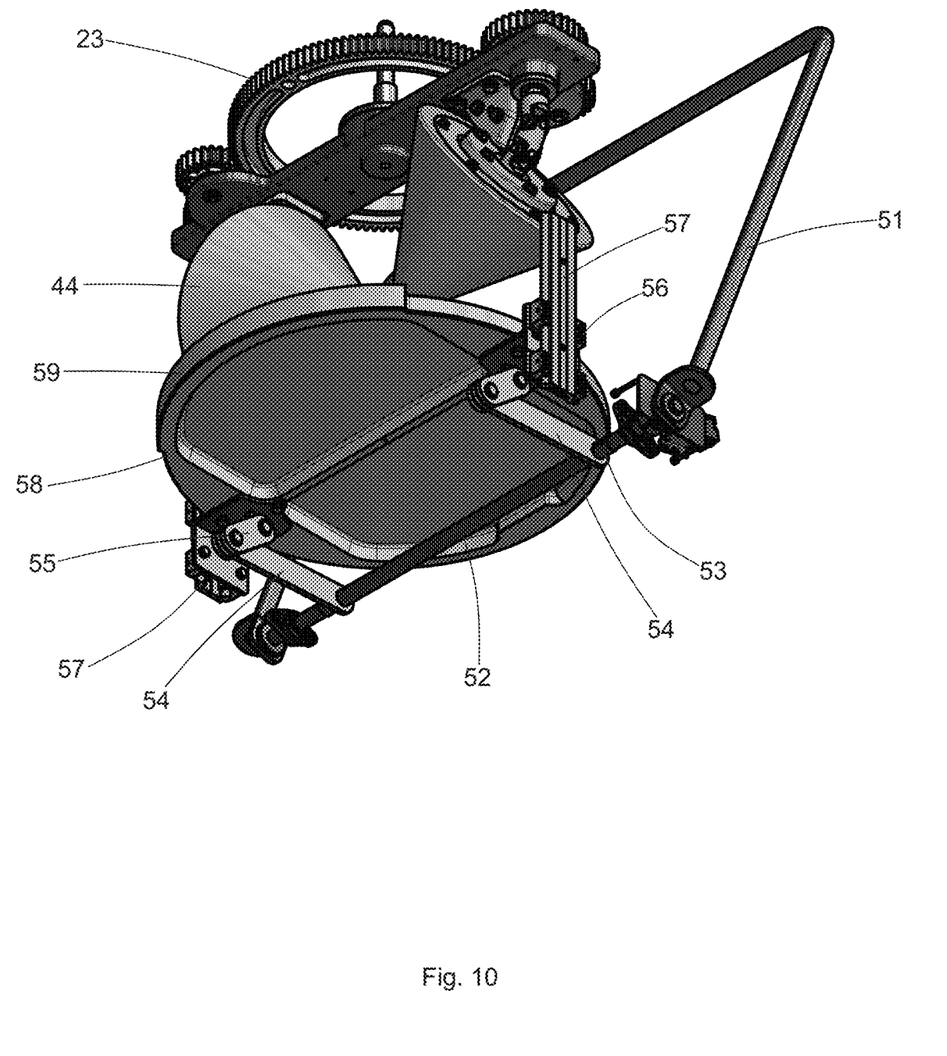
FIG. 10 is a three-dimensional view of the underside of the machine and shows components of the lifting mechanism of the lifting table (58).

The dough kneading and shaping machine also comprises a lifting mechanism (5) of the table (58) for lifting and supporting the dough to be kneaded and shaped. The lifting mechanism (5) has a manual lever (51) which, labeled on the structural body (12) of the machine, rotates the longitudinal bar (52) as shown in FIGS. 7 and 10. The longitudinal bar (52) has bezels (53) of rotation rods (54). The end of the rotation rod (54) is hinged to the pivot bar (55). The other end of the pivot bar (55) is labeled on the lower surface of the lifting table (58). The linear movement of the table (58) caused by the pivot bar (55) is guided by the sliding bearing (56) fixed to the side of the lifting table (58). The course of the sliding bearing (56) is determined by the linear guide (57). The linear guide (57) is rigidly embedded in the structural body (12) of the machine. The lifting table (58) has a partially high edge (59). The lifting table (58) preferably has a flat circular shape. It may optionally have a convex conical or concave conical shape.

The process of kneading and shaping the dough begins with placing a ball of dough in the center of the lifting table (58). The motor (1) is turned on rotating the axis (11). The axis (11) transmits rotational movement to the beam (21) which contains, at each end, a pair of gears (22 and 24) engaged together. The sprocket (22) is engaged with the sprocket (23) fixed to the structural body (12) of the machine. The sprocket (22) acts as the drive wheel of the sprocket (24). The sprocket axis (24) transmits rotation to the universal joint (27) and this transmits the rotation speed of the axis (31) of the body (42) of the cone (4). The cap (44) rotates with the body (42) of the cone (4). Having established the rotation movement of the block containing the cones (4) and the rotation movement of each cone (4) in relation to the axis itself, the elevation of the lifting table (58) is started by manually actuating the lever (51) which rotates the longitudinal bar (52). The longitudinal bar (52) rotates the rotation rods (54). The end of the rotation rod (54) articulated with the pivot bar (55) moves the lifting table (58). Because the articulation of the pivot bar (55) labeled on the lower surface of the lifting table (58) and the course of the sliding bearing (56) is determined by the linear guide (57), the lifting table (58) moves in vertical linear motion in the direction of the (4) conical rollers. The adjustment of the rotation speed of the rollers (4) in relation to the axis itself is given by the ratio between the diameters of the gear pairs (22 and 24).

The invention claimed is:

1. DOUGH KNEADING AND SHAPING MACHINE that uses one or more conical rollers to knead and shape dough on a lifting and a support table for the dough to be kneaded, characterized by a drive mechanism of the dough kneading and shaping machine, comprising a gear motor with a first axis at the output of the reducer, and the end of the first axis is set in a beam which has, at each end, a pair of gears, and the gears are geared to a sprocket fixed to a structural body of the dough kneading and shaping machine, and the gears have a second axis supported on bearings and coupled to a universal joint, and the universal joint transmits rotation to the third axis, and the third axis has at the bearing ends embedded in the rigid structure and with the aid of screws and structural elements, the rigid frame is fixed to the beam, and the third axis end is set at the vertex of the body of the cone, and the cone has a surface cap fixed by screws on the body and the surface cap covers the entire conical surface of the cone;

wherein the DOUGH KNEADING AND SHAPING MACHINE further comprises a table lifting mechanism supporting the dough to be kneaded and shaped, the table lifting mechanism comprises a manual lever, a longitudinal bar, two pivot bars, two sliding bearings and two linear guides, wherein the manual lever is labeled in the structural body of the machine, the longitudinal bar has two bezels of rotation rods and the ends of the rotation rods are articulated with the two pivot bars, the other ends of the two pivot bars are labeled on the lower surface of two sides of the lifting table, the two sliding bearings are fixed to two sides of the lifting table, the two linear guides are rigidly embedded at two sides of the structural body of the machine, the manual lever is configured to drive the lifting table to move in vertical through the two sliding bearings being guided by two linear guides.

2. DOUGH KNEADING AND SHAPING MACHINE according to claim 1, characterized by the adjustment of the rotation speed of the one or more conical rollers in relation to the first axis itself by the ratio between the diameters of the gear pairs.

3. DOUGH KNEADING AND SHAPING MACHINE according to claim 1, characterized in that the lifting table has a flat circular shape.

4. DOUGH KNEADING AND SHAPING MACHINE, according to claim 2, characterized in that the lifting table has a convex conical or a concave conical shape.

5. DOUGH KNEADING AND SHAPING MACHINE according to claim 1, characterized in that the lifting table has a partially high edge.

6. DOUGH KNEADING AND SHAPING MACHINE according to claim 1, characterized by the gear motor that rotates the first axis, transmitting rotation movement to the beam which contains, at each end, the pair of gears engaged with each other and the sprocket is engaged with the sprocket fixed to the structural body of the machine and the sprocket acts as a drive wheel of the sprocket and a fourth axis transmits rotation to universal joint and this transmits the rotation speed of the third axis of the body of the cone and the surface cap rotates together with the body of the cone and establishing the rotational movement of the block containing the cones and the rotational movement of each cone in relation to the third axis itself and the elevation of the lifting table being by manually actuating the manual lever which rotates the longitudinal bar and the longitudinal bar rotates rotation rod and the end of the rotation rod articulated with an articulation bar moving the lifting table and the displacement of the lifting table being equal to the sliding bearings course determined by the linear guides, and the lifting table moves in vertical linear movement towards the one or more conical rollers.

7. DOUGH KNEADING AND SHAPING MACHINE that uses the one or more conical rollers to knead and shape dough on the lifting table, according to claim 1, characterized in that the machine's drive mechanism has gears with the first axis supported by bearings and coupled in a homokinetic joint, and the homokinetic joint transmit rotation to the third axis.

* * * * *